United States Patent
Cresap et al.

[15] 3,652,185
[45] Mar. 28, 1972

[54] ELASTOMERIC ROTOR BLADE MOUNT

[72] Inventors: Wesley Louis Cresap, Fort Worth; Castle Hugh Fagan, Irving; Martin Harrison Lufkin, Fort Worth, all of Tex.

[73] Assignee: Textron Inc.

[22] Filed: Mar. 13, 1970

[21] Appl. No.: 19,320

[52] U.S. Cl. .......................................... 416/134, 416/136
[51] Int. Cl. ................................................ B64c 27/48
[58] Field of Search ........................... 416/134–141, 102

[56] References Cited

UNITED STATES PATENTS

| | | | |
|---|---|---|---|
| 2,830,669 | 4/1958 | Klockner | 416/102 UX |
| 3,106,965 | 10/1963 | Gorndt et al. | 416/134 UX |
| 3,111,172 | 11/1963 | Gorndt et al. | 416/135 X |
| 3,193,019 | 7/1965 | Drees et al. | 416/140 |
| 3,280,918 | 10/1966 | Drees et al. | 416/136 UX |
| 3,292,712 | 12/1966 | Schmidt | 416/141 UX |

Primary Examiner—Everette A. Powell, Jr.
Attorney—Richards, Harris and Hubbard

[57] ABSTRACT

An elastomeric rotor mounting structure for a helicopter blade is provided. In the mounting, a blade grip is coupled to a yoke structure by means of radial-thrust elastomeric bearings and the yoke structure is connected to the rotor hub. The elastomeric bearings simplify the rotor design and eliminate the need for bearing lubrication.

8 Claims, 6 Drawing Figures

INVENTORS:
WESLEY L. CRESAP
CASTLE H. FAGAN
MARTIN H. LUFKIN

Richards, Harris & Hubbard
ATTORNEY

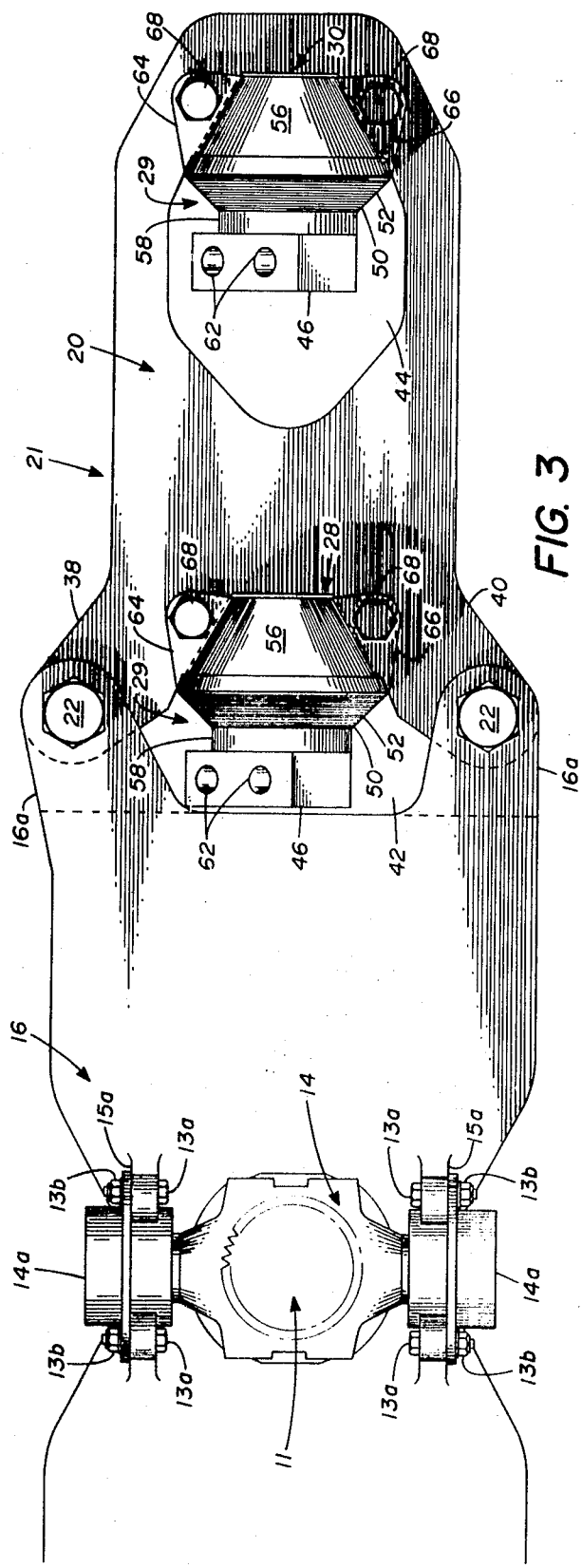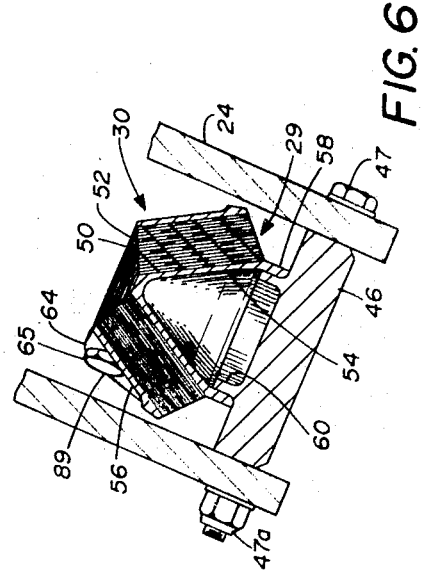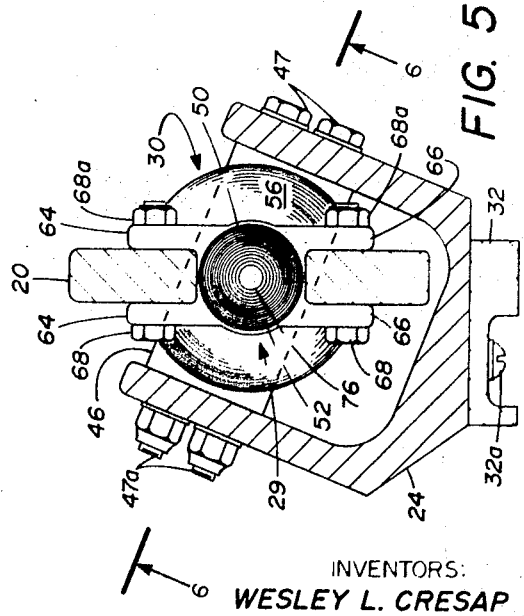

ELASTOMERIC ROTOR BLADE MOUNT

This invention relates to a mounting structure for a rotor blade of a rotary wing aircraft and more particularly to a coupling system involving elastomeric bearings for mounting rotor blades without the use of conventional metal-to-metal bearings.

In the past, each rotor blade of a rotary wing aircraft has been mounted by means of a blade grip which was connected to a yoke from the rotor on ball bearings, needle bearings or the like. Such mountings (sometimes in combination with auxiliary devices, such as tension-torsion straps) transfer centrifugal forces developed by blade rotation and bending forces that are produced on the system by blade airloads. Since blade loads and motions are generally quite high, the metal-to-metal bearings have caused a great deal of trouble from mechanical wear and failure.

The present invention is directed to a system in which both the centrifugal forces and bending loads of a helicopter blade are transferred to a rotor hub through a linkage in which metal-to-metal bearings are eliminated and in which structure is provided to advantageously utilize elastomeric bearings. The loads are transferred through the elastomeric elements which also permit the required relative motions by internal deformations of the elastomer.

In accordance with the invention, an elastomeric mounting structure is provided for a helicopter rotor blade. In the mounting, a yoke structure which connects to a hub on the rotor has multiple recesses to receive axially spaced radial-thrust bearings and connects to their inboard ends and to the blade. The yoke structure is connected to the outboard end of the bearings. The bearings have alternate and adhered conically shaped metal and elastic layers whose boundaries converge toward and in a direction essentially in line with the blade. The bearings accommodate rotational motion of the blade and transfer bending and centrifugal force loads from the blade to the yoke.

More particularly, in the invention an elastomeric mounting structure for a helicopter rotor blade is provided in which a yoke structure connects to a hub on the rotor and has a plurality of recesses or seat regions spaced apart in the direction of the radius of the hub to receive a corresponding plurality of axially spaced radial-thrust bearings. In the mounting structure, a blade grip encompasses an outboard portion of the yoke structure and is connected on the outboard end of the grip to the rotor blade. The elastomeric radial-thrust bearings, each in a seat region, have alternate and adhered conically shaped metal and elastic layers whose boundaries converge in the direction of the blade. Also seating structures are provided in each seat region for engaging the outer surfaces of the bearings, and structure engaging the inner surfaces of the bearings couples the bearings to the grip for the transfer of blade bending and centrifugal forces between the blade and the yoke by way of the bearings.

Further objectives and advantages of the invention will be set forth in the following detailed description of a preferred embodiment of the invention with reference to the accompanying drawings in which:

FIG. 3 is a top view of the yoke, yoke extension and radial-thrust elastomeric bearings in position for blade mounting with indications of the overall structure of each element.

FIG. 4 is a cross-sectional view of a conical radial-thrust elastomeric bearing.

FIG. 5 is a sectional view along line 5—5 of FIG. 2. The view shows the mounting of the elastomeric bearing to the grip and to the yoke extension.

FIG. 6 is a sectional view along line 6—6 of FIG. 5. It shows the mounting of the elastomeric bearing to the grip.

Figure 1:
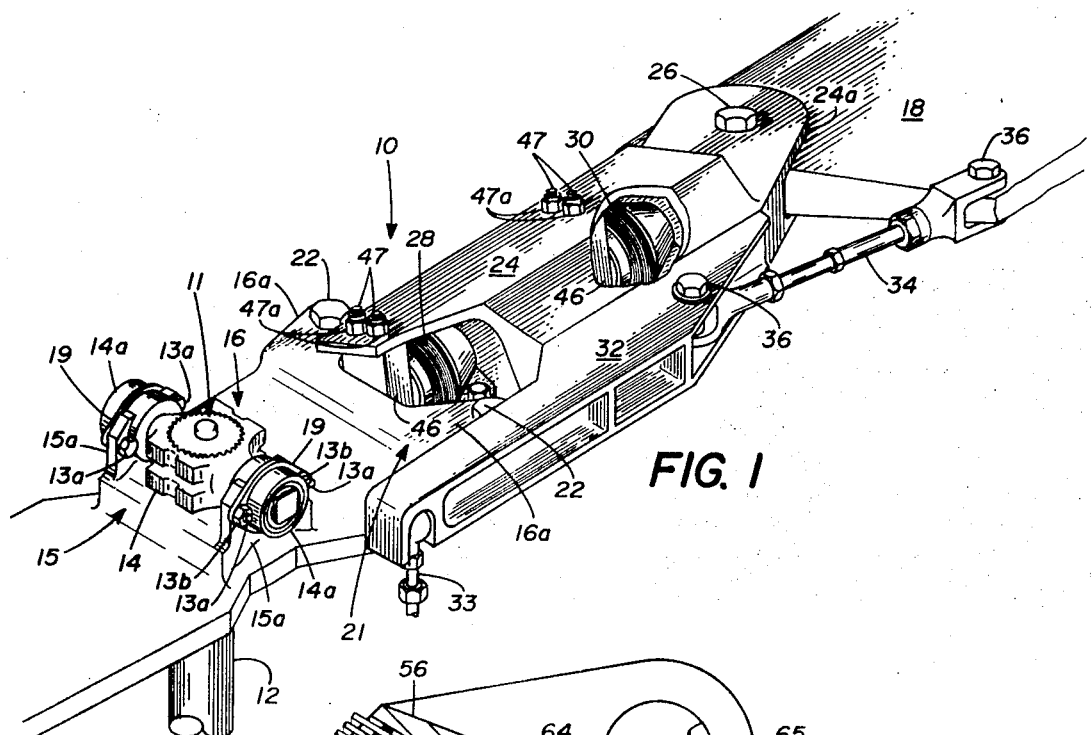
FIG. 1 is a partially schematic pictorial representation of a main rotor mounting structure.

A preferred embodiment of the invention is shown in FIG. 1 as applied to the mounting of a main rotor blade. The figure shows a helicopter mast 12 connected into a hub 11 which contains a hub trunnion 14 to which a helicopter blade 18 is attached by means of the elastomeric main rotor mounting structure 10 which is comprised of a yoke structure 21, a grip 24 and two conical elastomeric radial-thrust bearings 28 and 30. The structure 21 contains a yoke 16 attached to the trunnion 14 through a yoke-trunnion mounting member 15 and radial bearing units 14a. The yoke-trunnion mounting member 15 is an integral part of the yoke 16 and contains upward extending radial bearing mounts 15a which contain holes to receive bolts 13a. The bolts 13a also pass through holes in mounting lugs 19 on the bearing units 14a so that the units 14a are firmly attached to the mounts 15a with nuts 13b which are threaded onto the bolts 13a.

Figure 2:
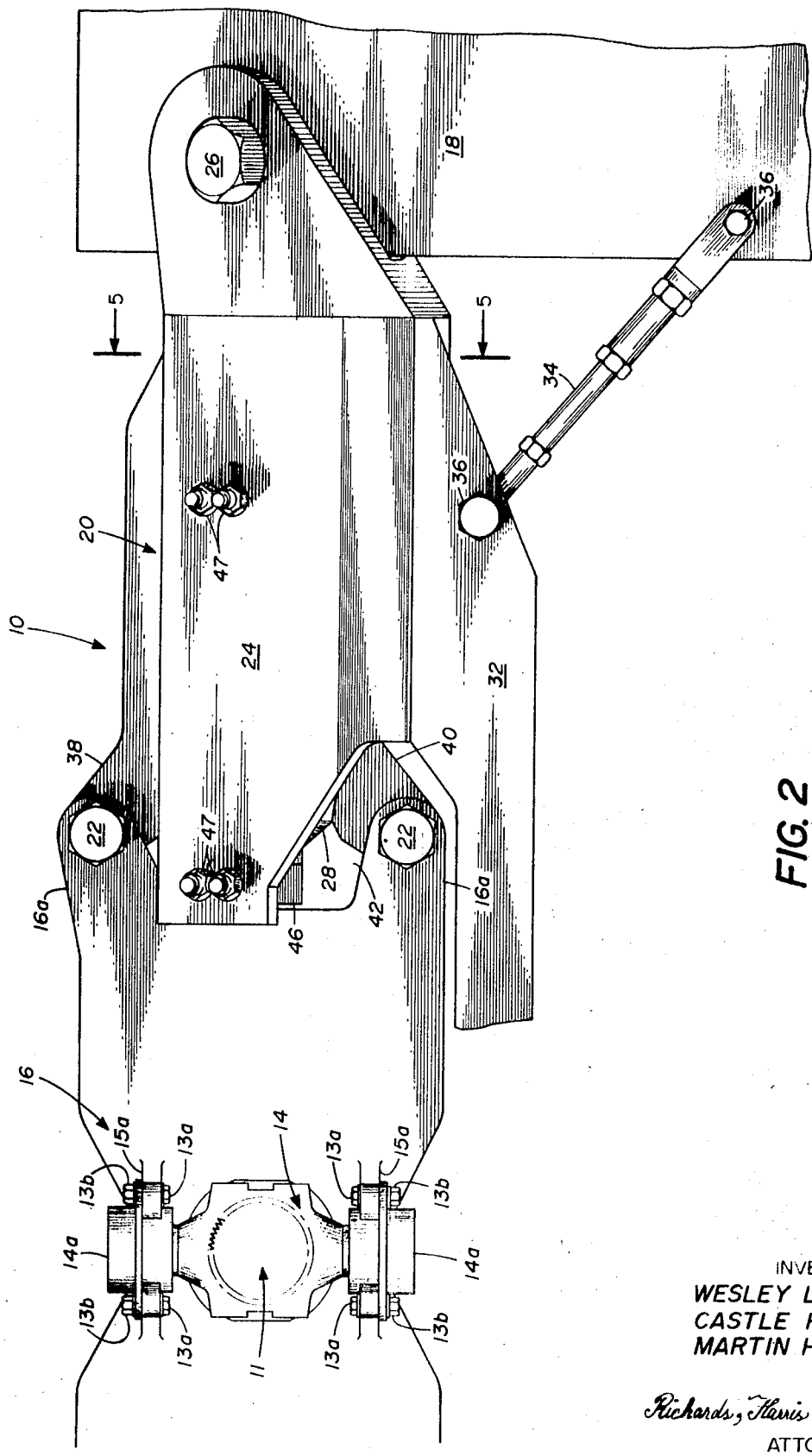
FIG. 2 is a top view of the main rotor mounting structure for a helicopter blade.

The yoke 16 has on it outboard end four lobes 16a, two on each side, with each lobe containing a hole to receive bolts 22 to connect the yoke 16 to a yoke extension 20 (FIG. 2).

The grip 24 is connected to the blade 18 by a blade retaining bolt 26 which passes through holes in tangs 24a on the outboard end of grip 24 and a matching hole in the blade 18. A grip body 24b of the grip 24 is attached by means of nuts 47a and bolts 47 which pass through holes in the body 24b to bearing blocks 46 which are in turn connected to the conical elastomeric radial-thrust bearings 28 and 30 which connect the grip 24 to the yoke extension 20 while permitting limited rotational and longitudinal movement between the grip 24 and the extension 20. A pitch horn 32 is fixedly attached to the grip 24 and a drag brace 34 adjustably connects the blade 18 to the pitch horn 32 by means of bolts 36. A pitch horn control tube 33 may be attached to the horn 32.

FIG. 2 is a top view of the elastomeric main rotor mounting structure 10. It shows the hub 11 and the hub trunnion 14 with radial bearings 14a to which the yoke 16 is attached by means of bolts and nuts 13a and 13b through mounts 15a. On the outboard end of the yoke 16, the lobes 16a receive inboard directed single tangs 38 and 40 of the yoke extension 20. Bolts 22 secure the yoke extension 20 to the yoke 16 through matching holes in the lobes 16a and the tangs 38 and 40.

Coaxial recesses or seat regions 42 and 44 (FIG. 3) are formed by the yoke 16 and yoke extension 20. The recess 42 is formed between the yoke 16 and the yoke extension 20. The recess 44 is formed within extension 20 (FIG. 3). The helicopter blade 18 is attached to the grip 24 by means of the blade retaining bolt 26 and the blade 18 is adjustably connected to the pitch horn 32 by means of the drag brace 34 which is attached to the blade 18 and the pitch horn 32 by bolts 36. The pitch horn 32 is fixedly attached to the grip 24. The conical elastomeric radial-thrust bearings 28 and 30 (FIG. 3) are attached to the bearings blocks 46 (FIG. 3) which are in turn attached to the grip 24 by means of the bolts 47.

The relationships between the conical elastomeric bearings 28 and 30 and the yoke 16 and yoke extension 20 which form the yoke structure 21 are best portrayed in FIG. 3. The figure shows the hub 11 and the hub trunnion 14 which connects to the helicopter mast 12 (FIG. 1) and the radial bearings 14a through which the yoke 16 is rotatably connected to the trunnion 14. The yoke lobes 16a contain holes through which bolts 22 secure the inboard directed single tangs 38 and 40 of the yoke extension 20. The inboard directed tangs 38 and 40 are held between the parallel lobes 16a on each side of the yoke 16. When assembled, the outboard directed lobes 16a of the yoke 16 and the inboard directed tangs 38 and 40 of the yoke extension 20 form the recess 42 into which the conical elastomeric radial-thrust bearing 28 is mounted.

The yoke extension 20 contains the recess 44 which is coaxially aligned with the recess 42 and the center of the hub 11. The recess 44 extends completely through the extension 20. It provides a mounting for the second conical elastomeric radial-thrust bearing 30. The outboard bearing 30 is the same as the inboard bearing 28 and both are attached in the same manner as shown in FIGS. 5 and 6.

The bearing 28, (and likewise bearing 30), is made up of bonded alternating layers of thin metal truncated cones 50 and thin elastomer truncated cones 52 with a heavier metal inner bounding surface 54 (FIG. 4) and a heavier metal outer bounding surface 56. The inner bounding surface 54 (FIG. 4) extends beyond the bearing members 50 and 52 in a cylindrically shaped extension 58 which can be press fitted over a ridge 60 (FIG. 6) extending from the bearing block 46 which contains holes 62 through which the bolts 47 (FIG. 2) are passed to attach the block 46 and bearing 28 to the grip 24 (FIG. 2). The outer bounding surface 56 of the bearing 28 has lug member 64 and 66 with each such member consisting of two parallel lugs with holes 65 and 67 (FIG. 4) in them. The bearing 28 is attached to the yoke extension 20 by passing the inboard portion of the yoke extension 20 through the parallel lug members 64 and 66 until the lug holes 65 and 67 are aligned with holes (not shown) in the yoke extension so that the bolts 68 may be passed through the holes 65 and 67 of lug members 64 and 66 and the corresponding holes of the yoke extension 20.

FIG. 4 is a detailed sectional view of the conical elastomeric radial-thrust bearing 28. (A sectional view of bearing 30 would be identical.) The metal inner bounding surface 54 contains the cylindrically shaped extension 58 which is used to connect the bearing to a bearing block such as bearing block 46 shown in FIG. 3. The bearing 28 is molded or bonded together so that the inner bounding surface 54 adheres to an elastomeric bearing pad 29 which consists of a plurality of alternating thin metal truncated cones 50 and thin elastomer truncated cones 52 which adhere to each other and to the metal outer bounding surface 56 which is generally in the shape of a truncated cone with the two parallel lugs 64 on one side and the pair of parallel lugs 66 on the opposite side to provide means for connecting the bearing 28 to the yoke extension 20 (FIG. 3). Hole 65 extends through the two lugs 64, and hole 67 extends through the two lugs 66. The bearing 28 is mounted to the inboard end of the yoke extension 20 by passing the yoke 20 between the parallel lugs 64 and between the parallel lugs 66 until holes 65 and 67 are aligned with corresponding holes in the yoke extension 20 to permit bolts 68 (FIG. 3) to pass through holes 65 and 67 (FIG. 3) and thereby secure the bearing 28 to the extension 20.

In one embodiment of the elastomeric bearing 28, the metal truncated cones 50 and the elastomer truncated cones 52 had thicknesses of 0.03 inch with the outer bounding surface 56 and inner bounding surface 54 having thicknesses of the order of 0.15 inch and being made of steel. The bearings made from these units were approximately 6 inches in diameter at the largest conical dimension and extended approximately 4 inches along the axis of the cone. The sides of the truncated conical members made a 30° angle with the axis of the bearing.

FIG. 5 is a section view through the elastomeric bearing mount as shown in FIG. 2. The figure shows the relationships between the grip 24, the outboard radial-thrust bearing 30 and the yoke extension 20. As shown by the figure, the yoke extension 20 is fastened by means of bolts 68 and nuts 68a to the sets of parallel lug members 64 and 66 of the outer bounding surface 56. The bounding surface 56 is molded or bonded to the elastomeric bearing pad 29 as shown in FIG. 4. The bearing pad 29 is bonded on its inner side to the inner bonding surface 54 which is attached as shown in FIG. 6 to the bearing block 46 which in turn is attached by means of bolts 47 and nuts 47a to the grip 24. FIG. 5 also shows the pitch horn 32 which is fastened to the grip by means of screw 32a. (Bearing 28 is attached in the same manner to the yoke extension 20 and grip 24.)

FIG. 6 shows the mounting of the bearing 30 to the grip 24 in a cross section identified in FIG. 5. FIG. 6 shows the bearing 30 with its outer bounding surface 56 containing the lug member 64 with hole 65 to receive bolt 68 (FIG. 5). The outer bounding surface 56 is molded or bonded to the elastomeric bearing pad 29 comprising alternating thin elastomer and metal truncated cones 52 and 50. The inner side of the bearing pad 29 adheres to the metal inner bounding surface 54 which is conical in shape over the portion which is in contact with the bearing pad 29 and has a cylindrical extension 58 extending from the larger end of the truncated cone. The cylindrically shaped extension 58 is press or force fitted over the cylindrical structure or ridge 60 which is an integral part and extension of the bearing block 46 which contains holes which may be aligned with suitably provided holes in the grip 24 so that the bolt 47 may be passed therethrough to fasten the bearing block 46 to the grip 24 with the aid of the nut 47a.

In operation, the centrifugal force of the blade 18 is carried by the two radial-thrust elastomeric bearings 28 and 30 and the blade-bending loads are transferred through the bearings to the yoke as a couple. Since metal-to-metal motion is eliminated in this invention, mechanical wear and failures due to blade motion are reduced. Also the design of the aircraft is simplified because the elastomeric radial-thrust bearings eliminate the need for tension-torsion straps, the conventional grip bearings and oil or grease retainers and seals. A number of close-tolerance retaining parts necessary with metal bearings are not required with the elastomeric bearings. The elastomeric bearings require less maintenance, eliminate the need for lubrication and increase safety. Safety is increased because the bearings are naturally fail-safe and also because their wear is gradual and visible. The elastomeric bearings make it possible for the natural frequencies of the rotor units to be controlled by adjustments in the stiffness of the bearing members.

Although the foregoing example has involved the mounting of a main rotor blade through the use of elastomeric bearings which accommodate the various forces and motions necessary in operation, it will be appreciated that the mounting herein described may also be employed for tail rotor mountings as well wherein the bending moments as well as thrust and rotational forces are to be opposed and properly transferred to the tail rotor hub.

Thus, it may be seen that the preferred embodiment satisfies the objectives of this invention since it provides a system in which the centrifugal forces and bending movements of a helicopter blade are coupled to a rotor through a linkage in which bearings with metal-to-metal relative motion are eliminated and in which structure is provided to utilize elastomeric bearings.

The invention has been described in connection with the foregoing embodiment thereof. It is to be understood that further modifications of the mounting structure may now suggest themselves to those skilled in the art. It is intended to cover such modifications as fall within the scope of the appended claims.

What is claimed is:

1. An elastomeric rotor mounting structure for a helicopter blade which comprises:
   a. a yoke structure connected to a hub on said rotor and having a plurality of seat regions to receive a corresponding plurality of axially spaced radial-thrust bearings;
   b. a blade grip connected on the outboard end thereof said blade;
   c. a pair of frustoconically shaped elastomeric radial-thrust bearings each mounted in one of said seat regions and each having alternate and adhered frustoconically shaped metal and elastic layers which converge in the direction of said blade;
   d. seating structures in each seat region for engaging the outer surface of said bearings; and
   e. structure engaging the inner surface of said bearings coupled to said grip for the transfer of blade bending and centrifugal forces between said blade and said yoke structures by way of said bearings.

2. The mounting structure of claim 1 wherein the yoke structure connected to the hub on said rotor has a pair of seat regions spaced apart in the direction of the radius of said hub to receive two axially spaced radial-thrust bearings.

3. An elastomeric rotor mounting structure for a helicopter blade which comprises:
   a. a yoke structure connected to a hub on said rotor and having a pair of recesses spaced apart in the direction of the radius of said hub to receive two axially spaced radial-thrust bearings;

b. a blade grip axially encompassing an outboard portion of said yoke structure and connected on the outboard end thereof to said rotor blade;

c. a hollow, frustoconically shaped elastomeric radial-thrust bearing in each said recess, each bearing comprising alternate and adhered frustoconically shaped metal and elastic layers which converge in the direction of said blade;

d. seating structures secured to the outboard margins of each of said recesses and each comprising a frustoconically shaped cup for receiving the outer surface of one of said bearings; and e. conically shaped members engaging the inner surface of said bearings and coupled to said grip for the accommodation of blade pitch change motions and the transfer of blade bending and centrifugal forces between said blade and said yoke structure by way of said bearings.

4. The mounting structure of claim 3 wherein the yoke structure comprises:

a. a yoke connected on an inboard end to said hub and having on the outboard end thereof two outboard extending sets of lobes separated from each other;

b. a yoke extension containing two inboard extending single tangs separated from each other and shaped to mesh with the outboard extending lobes of the yoke to define with said lobes a first of said recesses;

c. means for connecting the yoke extension to the yoke; and d. said yoke extension having the second of said recesses therein and extending completely through the yoke extension and radially aligned with the first of said recesses.

5. The mounting structure of claim 3 wherein the blade grip comprises:

a. two outboard extending parallel tangs to receive and hold said main rotor blade;

b. means for securing said blade to said parallel tangs;

c. a grip body, U-shaped in cross section, to encompass the outboard portion of said yoke structure; and d. means for attaching the inner surface of said radial-thrust bearings to the grip body.

6. The mounting structure of claim 3 wherein the seating structures for engaging the outer surfaces of said bearings comprise:

a. structure defining said recesses in said yoke structure shaped to receive said conically shaped radial-thrust bearings within he outboard ends of said recesses, b. two sets of two parallel lugs extending from and attached to said outer surface of said bearing with one said set of lugs positioned on the opposite side of said bearing to the other said set of lugs, said lugs in each said set separated so as to receive a portion of the yoke extension between them, and c. means for attaching said lugs to the yoke extension.

7. The mounting structure of claim 3 wherein the structure engaging the inner surface of each of said bearings and coupled to said grip comprises:

a. a bearing block extending traversely to the axis of said radial-thrust bearings;

b. means for attaching said bearing block to said grip;

c. cylindrical structure integral with and extending perpendicularly from said bearing block; and d. a cylindrical extension on said inner surface of said bearing mated with said cylindrical structure.

8. The combination set forth in claim 7 wherein said cylindrical structure and said cylindrical extension are dimensional to be mated with a force fit.

* * * * *

UNITED STATES PATENT OFFICE
CERTIFICATE OF CORRECTION

Patent No. 3,652,185          Dated March 28, 1972

Inventor(s) Wesley Louis Cresap

It is certified that error appears in the above-identified patent and that said Letters Patent are hereby corrected as shown below:

In the grant (only) insert the attached sheets.

Signed and sealed this 12th day of December 1972.

(SEAL)
Attest:

EDWARD M. FLETCHER, JR.
Attesting Officer

ROBERT GOTTSCHALK
Commissioner of Patents